United States Patent
Bonnville

(10) Patent No.: US 6,439,608 B1
(45) Date of Patent: Aug. 27, 2002

(54) BRACKET AND SIDE RAIL STRUCTURE FOR SUPPORTING A STEERING GEAR ON A VEHICLE FRAME ASSEMBLY

(75) Inventor: Kenneth J. Bonnville, Peoria, AZ (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/649,274

(22) Filed: Aug. 28, 2000

Related U.S. Application Data

(60) Provisional application No. 60/151,781, filed on Aug. 31, 1999.

(51) Int. Cl.[7] .............................................. B62D 21/00
(52) U.S. Cl. .................... 280/796; 180/311; 248/224.8; 280/781; 280/798
(58) Field of Search ................................ 280/781, 785, 280/796, 798; 403/270, 271, 272; 248/224.8; 180/311, 312

(56) References Cited

U.S. PATENT DOCUMENTS

| | | | |
|---|---|---|---|
| 2,107,382 A | * 2/1938 | Maddock | ................... 180/311 |
| 3,556,552 A | 1/1971 | Deckert | |
| 3,814,457 A | 6/1974 | Baur | |
| 5,259,660 A | 11/1993 | Haesters | |

FOREIGN PATENT DOCUMENTS

| | | | |
|---|---|---|---|
| DE | 1780204 | * 12/1971 | ................. 280/796 |
| JP | 63-212182 | * 9/1988 | ................. 280/796 |

* cited by examiner

*Primary Examiner*—Eric Culbreth
(74) *Attorney, Agent, or Firm*—MacMillan, Sobanski & Todd, LLC

(57) ABSTRACT

A mounting bracket secures a steering gear or other ancillary device to a closed channel structural member, such as a hydroformed side rail in a vehicle frame assembly. The side rail has a relatively large opening formed through one of the walls thereof. A mounting bracket is provided for supporting the ancillary device on the side rail. The mounting bracket includes a generally flat web having upper and lower flanges extending therefrom. Between the two flanges, a reinforcing structure is provided. The reinforcing structure can include one or more spacers that extend laterally from the web. Each of the spacers may have a generally cylindrical bore formed therethrough. When assembled to the side rail, the upper and lower flanges of the mounting bracket respectively abut upper and lower walls of the side rail. At the same time, the reinforcing structure of the mounting bracket is received within the opening of the side rail, allowing the spacers to extend through the interior of the side rail into engagement with the inner surface of a wall thereof The mounting bracket can then be secured to the side rail in a conventional manner, such as by welding.

36 Claims, 4 Drawing Sheets

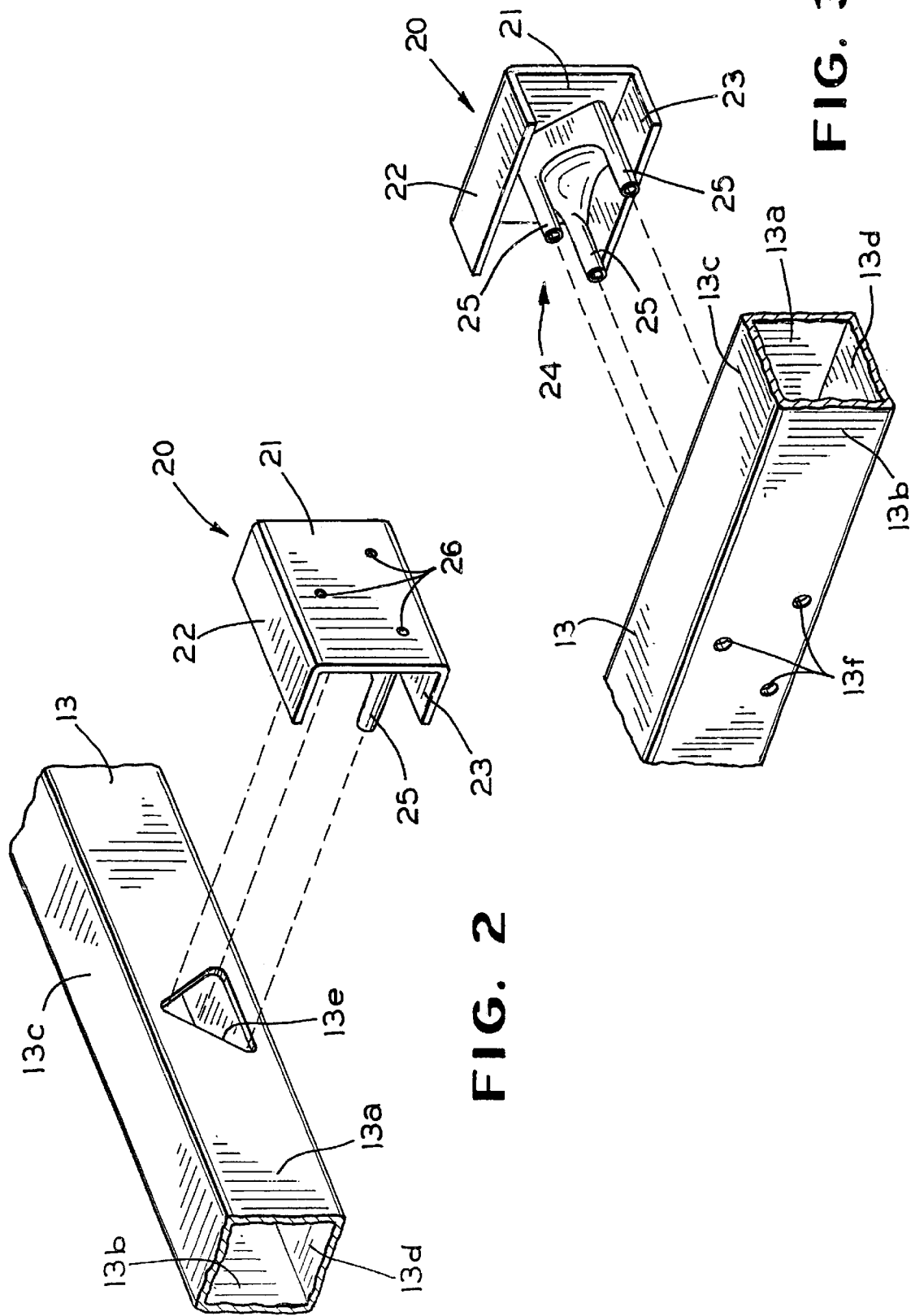

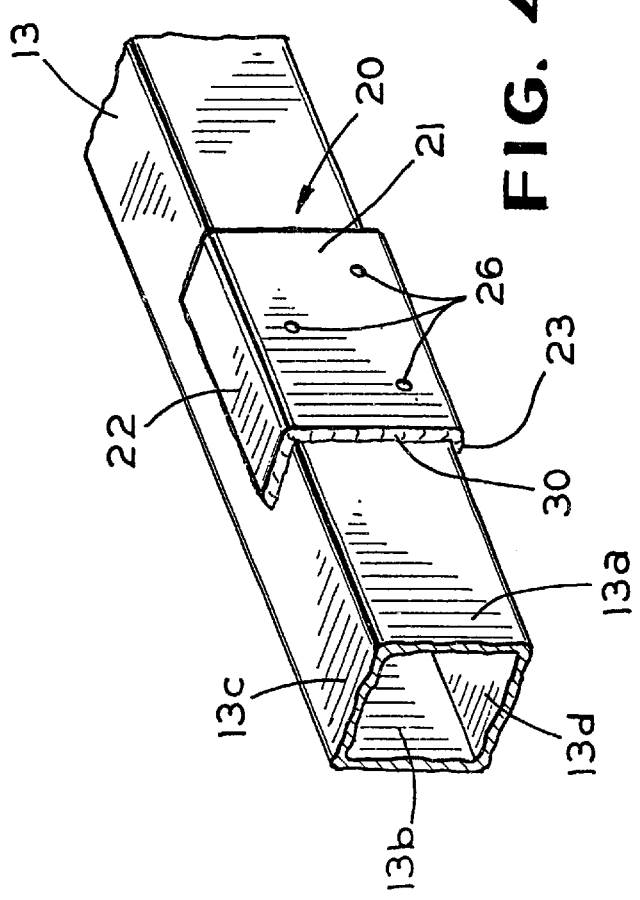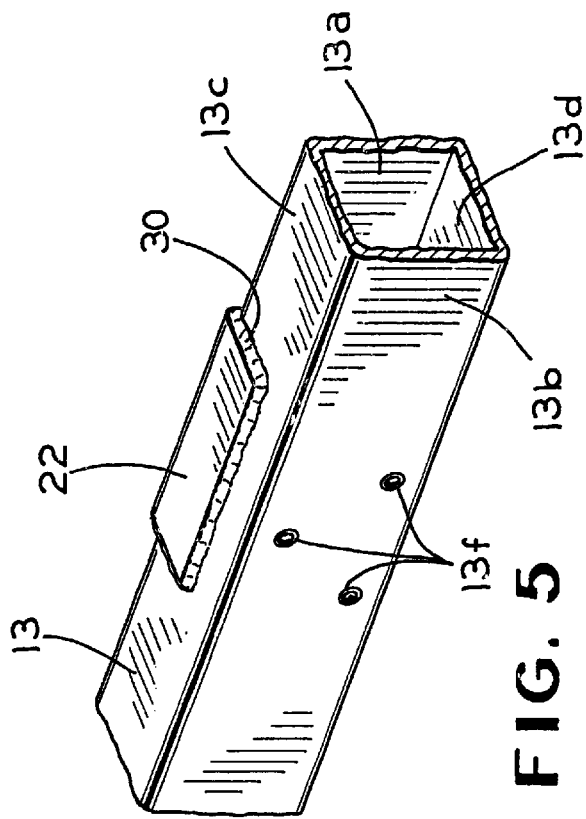
FIG. 4
FIG. 5

BRACKET AND SIDE RAIL STRUCTURE FOR SUPPORTING A STEERING GEAR ON A VEHICLE FRAME ASSEMBLY

CROSS REFERENCE TO RELATED APPLICATION

This application claims the benefit of U.S. Provisional Application No. 60/151,781, filed Aug. 31, 1999, the disclosure of which is incorporated herein by reference.

BACKGROUND OF THE INVENTION

This invention relates in general to structures for supporting a component on a closed channel structural member. In particular, this invention relates to an improved structure for a mounting bracket for supporting a steering gear or other ancillary device on a closed channel structural member, such as a hydroformed side rail in a vehicle frame assembly.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

In many instances, it is necessary or desirable to secure one or more ancillary devices to portions of the vehicle body and frame assembly. For example, most vehicles are provided with a steering system including a steering wheel that is connected through a shaft to a steering gear mechanism that, in turn, is connected through one or more rods to the steered wheels of the vehicle. In such a steering system, it is common for the steering gear to be supported on some portion of the body and frame assembly of the vehicle. Similarly, a variety of other ancillary devices are also commonly supported on some portion of the body and frame assembly of the vehicle. Regardless of its specific nature, the ancillary device can be mounted on the vehicle body and frame assembly by initially securing a mounting bracket to the portion of the body and frame assembly of the vehicle, and subsequently securing the ancillary device to the bracket.

Traditionally, the various components of known vehicle body and frame assemblies have been formed from open channel structural members, i.e., structural members that have a non-continuous cross sectional shape (U-shaped or C-shaped channel members, for example). Such open channel structural members are usually formed from flat metal stock that is bent or otherwise deformed into the desired cross sectional shape. The non-continuous cross sectional shape of such open channel structural members allows mounting brackets to be secured thereto in a relatively easy manner to as to support ancillary devices thereon in the manner described above. For example, it is well known to form one or more apertures through mating portions of the mounting bracket and the open channel structural member. The apertures are aligned with one another, and threaded fasteners are inserted therethrough to secure the two pieces together. Nuts or other retaining members can be threaded onto the ends of the threaded fasteners and tightened to secure the mounting bracket to the open channel structural member. Because of the non-continuous cross sectional shape of the open channel structural member, the ends of the threaded fasteners are easily accessible. Furthermore, because the mating portions of the mounting bracket and the closed channel structural member are generally flat, the nuts on the ends of the threaded fasteners can be tightened as desired without causing damage to either the mounting bracket or the open channel structural member.

However, more recently, it has been proposed to form one or more of the various vehicle body and frame components from closed channel structural members, i.e., structural members that have a continuous cross sectional shape (tubular or box-shaped channel members, for example). This cross sectional shape is advantageous because it provides strength and rigidity to the vehicle body and frame component. Also, this cross sectional shape is desirable because it facilitates the use of hydroforming. Hydroforming is a well known process that uses pressurized fluid to deform a hollow member into a desired shape. The hollow member is initially disposed between two movable die sections of a hydroforming apparatus that, when closed together, define a die cavity having a desired final shape for the hollow member. Thereafter, the hollow member is filled with a pressurized fluid, typically a relatively incompressible liquid such as water. The pressure of the fluid is increased to a magnitude where the hollow member is expanded outwardly into conformance with the die cavity. As a result, the hollow member is deformed into the desired final shape for the workpiece.

Unfortunately, it has been found to be somewhat more difficult to secure the above-described mounting brackets and ancillary devices to such closed channel structural members. This is because access to the end of the threaded fastener located within the interior of the closed channel structural member is relatively difficult, thus making it relatively difficult to thread the nut or other retaining device thereon. To address this, it has been proposed to form aligned apertures through a pair of opposed walls of a closed channel structural member and to have the threaded fastener extend through such aligned apertures. Because the end of the threaded fastener extends completely through the closed channel structural member, it is easily accessible to thread the nut or other retaining device thereon. However, care must be taken to prevent the nut from being excessively tightened, which could cause collapsing deformation or other damage to the closed channel structural member. To prevent this from occurring, it has further been proposed to provide a hollow cylindrical spacer about the portion of the threaded fastener that is disposed within the closed channel structural member. Because access to the interior of the closed channel structure member is limited, as mentioned above, the use of such spacers is also relatively difficult. Thus, it would be desirable to provide an improved structure for a mounting bracket for securing an ancillary device to a closed channel structural member that is relatively simple and inexpensive in construction and operation.

SUMMARY OF THE INVENTION

This invention relates to an improved structure for a mounting bracket for securing a steering gear or other ancillary device to a closed channel structural member, such as a hydroformed side rail in a vehicle frame assembly. The side rail has a relatively large opening formed through one of the walls thereof. A mounting bracket is provided for supporting the ancillary, device on the side rail. The mounting bracket includes a generally flat web having upper and lower flanges extending therefrom. Between the two flanges, a reinforcing structure is provided. The reinforcing structure can include one or more spacers that extend laterally from the web. Each of the spacers may have a generally cylindrical bore formed therethrough. When assembled to the side rail, the upper and lower flanges of the mounting bracket respectively abut upper and lower walls of the side rail. At the same time, the reinforcing structure of the mounting bracket is received within the opening of the side rail, allowing the spacers to extend through the interior of the side rail into engagement with the inner surface of a wall thereof. The mounting bracket can then be secured to the side rail in a conventional manner, such as by welding. Torsional loads and other forces that are generated by operation of the ancillary device are transferred through the mounting bracket to the side rail. The strength of the side rail is increased by the engagement of the web and the flanges of the mounting bracket with the outer surfaces of the walls thereof. Additionally, the engagement of the reinforcing structure of the mounting bracket with the inner surface of the wall of the side rail provides additional strength. Thus, the mounting bracket facilitates the use of such ancillary devices on the side rail.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is an exploded perspective view of a portion of one of the side rails illustrated in FIG. 1 and a first side of a mounting bracket for supporting an ancillary device, such as a steering gear, on the side rail in accordance with this invention.

FIG. 3 is an exploded perspective view of a portion of a second side of the side rail and a second side of the mounting bracket for supporting the ancillary device illustrated in FIG. 2.

FIG. 4 is a perspective view similar to FIG. 2 showing the portion of the closed channel structural member and the mounting bracket after assembly.

FIG. 5 is a perspective view similar to FIG. 2 showing the portion of the closed channel structural member and the mounting bracket after assembly.

DETAILED DESCRIPTION OF THE PREFERRED EMBODIMENT

Figure 1:
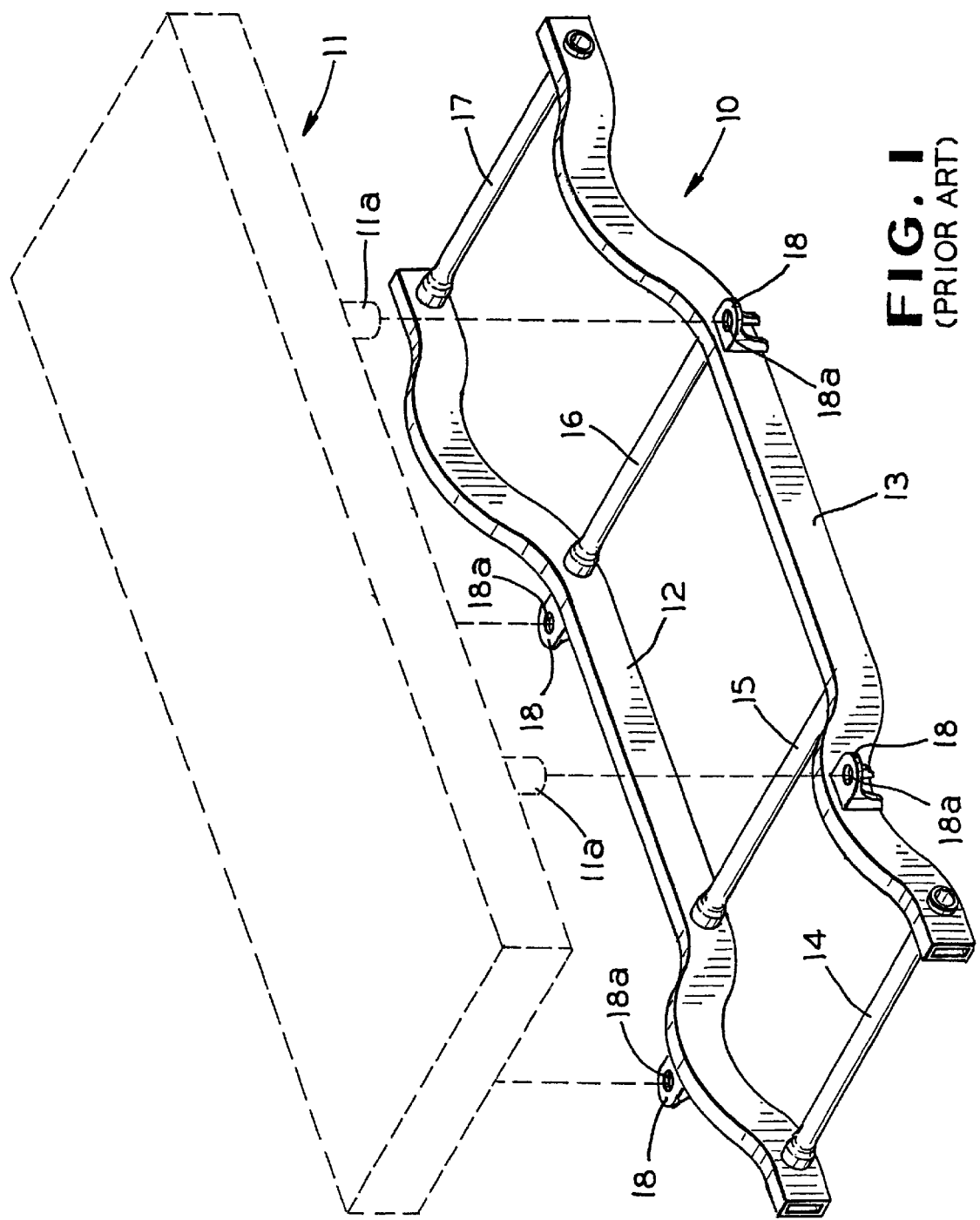
FIG. 1 is a perspective view of a portion of a prior art vehicular body and frame assembly including a pair of longitudinally extending closed channel structural members, such as a pair of side rail, having a plurality of transversely extending closed channel structural members, such as a plurality of cross members, connected therebetween.

Referring now to the drawings, there is illustrated in FIG. 1 a portion of a vehicular body and frame assembly that is conventional in the art. The illustrated vehicular body and frame assembly is a separate type of body and frame assembly, including a frame portion, indicated generally at 10, and a body portion, indicated generally at 11 as described above. Although this invention will be described and illustrated in the context of the illustrated separate type of vehicular body and frame assembly, it will be appreciated that this invention may be used in a unitized type of vehicular body and frame assembly, as described above.

The illustrated frame portion 10 of the vehicular body and frame assembly is a ladder type frame portion, including a pair of-longitudinally extending side rails 12 and 13 having a plurality of transverse cross members 14, 15, 16, and 17 extending therebetween. The side rails 12 and 13 extend longitudinally throughout the entire length of the frame portion 10 and are generally parallel to one another. Each of the side rails 12 and 13 in the illustrated embodiment is formed from a single closed channel structural member. However, it is known that one or both of the side rails 12 and 13 may be formed from a plurality of individually formed closed channel structural members that are secured together by any conventional means, such as by welding, riveting, bolting, and the like. Furthermore, it is known that portions of the side rails 12 and 13 may be formed from open channel structural members.

The cross members 14 through 17 extend generally perpendicular to the side rails 12 and 13 and may be formed having any conventional structure. The cross members 14 through 17 are spaced apart from one another along the length of the frame portion 13 and can be secured to the side rails 12 and 13 by any conventional means, such as by welding, riveting, bolting, and the like. When secured to the side rails 12 and 13, the cross members 14 through 17 provide lateral and torsional rigidity to the frame portion assembly 10 of the vehicular body and frame assembly.

A plurality of body mount support brackets 18 are provided on the vehicle frame assembly 10. The illustrated body mount support brackets 18 are stamped members that are secured to the side rails 12 and 13 of the vehicular body and frame assembly 10 by any conventional means, such as by welding, adhesives, and the like. The body mount support brackets 18 are provided to facilitate the connection of the body portion 11 and other various components (not shown) of the vehicle to the vehicular body and frame assembly 10. To accomplish this, each of the body mount brackets 18 has an opening 18a formed therethrough. The openings 18a are sized in accordance with respective body mounts 11a provided on the body portion 11 of the vehicular body and frame assembly 10. In a manner that is well known in the art, the body mounts 11a are received and supported within the openings 18a of the body mount support brackets 18 to connect the body portion 11 to the frame portion 10.

Referring now to FIGS. 2 through 6, there is illustrated a portion of one of the side rails 13. Although this invention will be described and illustrated in the context of supporting an ancillary device 40 (shown schematically in FIG. 6) on the side rail 13, it will be appreciated that this invention may be used to support the ancillary device 40 on any type of closed channel structural member. The illustrated side rail 13 is generally rectangular in cross sectional shape and includes an outer wall 13a, an inner wall 13b, an upper wall 13c, and a lower wall 13d. Although this invention will be described and illustrated in context of the side rail 13 having this generally rectangular cross sectional shape, it will be appreciated that this invention may be practiced with a side rail 13 or other closed channel structural member having any desired cross sectional shape. The side rail 13 may be formed in any conventional manner, such as by hydroforming. Furthermore, the side rail 13 may be formed from two or more pieces of material that are secured together to form a closed channel structural member. For example, two U-shaped open channel structural members may be secured together, such as by welding, to form the closed channel structural member. The side rail 13 can be formed from any desired material.

A relatively large opening or hole 13e is formed through one of the walls 13a of the side rail 13. Although this invention will, be described and illustrated with the opening 13e formed through the outer wall 13a, it will be appreciated that the invention can be practiced by forming the opening through any of the walls 13a, 13b, 13c, and 13d. The opening 13e may be formed through the wall 13a of the side rail 13 in any conventional manner, such as by cutting, stamping, or machining. Alternatively, the opening 13e may be formed through the wall 13a during the manufacture of the side rail 13, such as during a hydroforming operation. The illustrated opening 13e is generally triangular in shape. However, the opening 13e may be formed having any desired shape. If desired, one or more relatively small apertures 13f can be formed through the wall 13b opposite to the wall 13a. The purpose for the opening 13e and the apertures 13f will be explained below.

Figure 6:
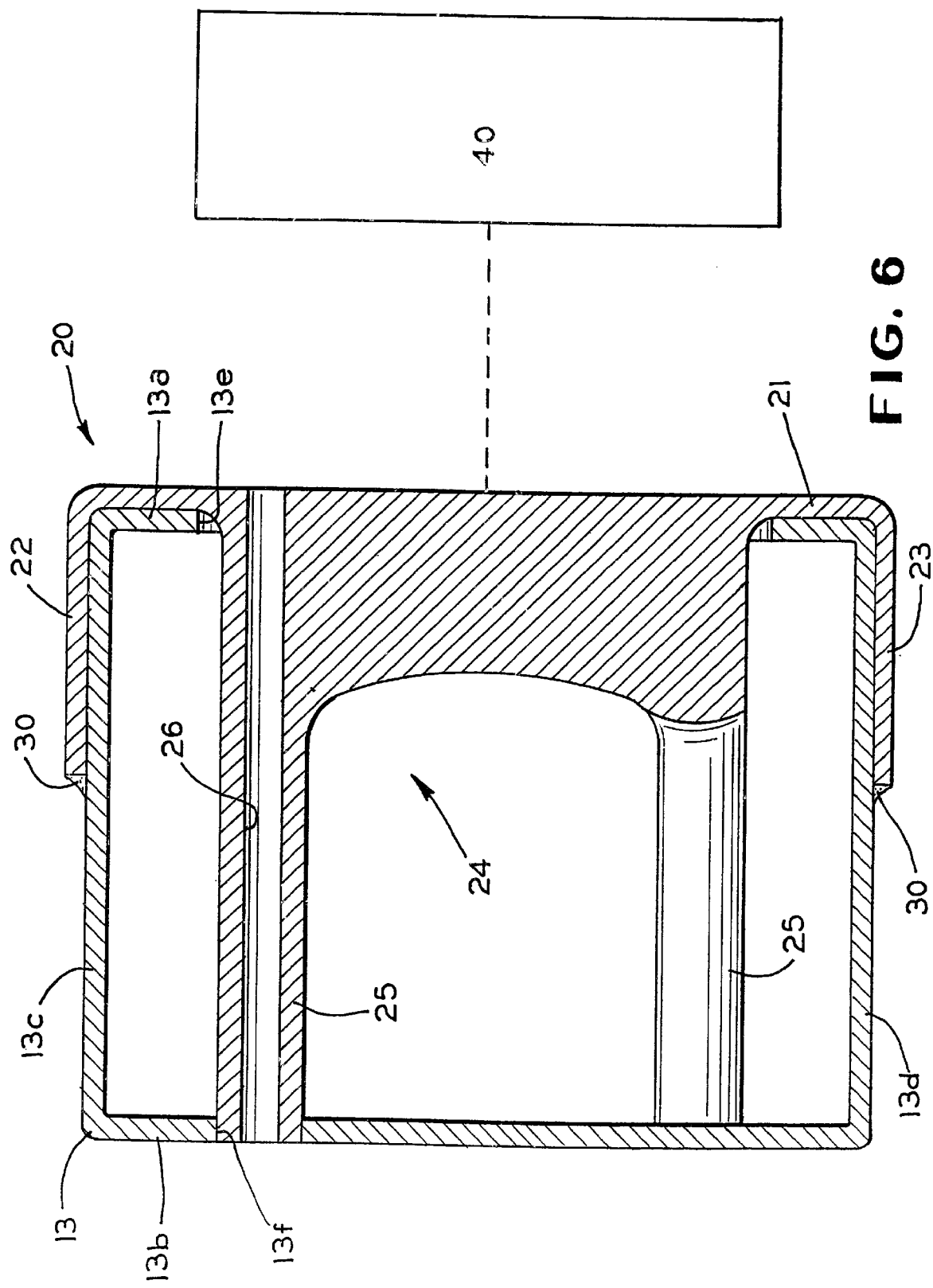
FIG. 6 is an enlarged sectional elevational view of the closed channel structural member and the mounting bracket shown in FIGS. 4 and 5.

A mounting bracket, indicated generally at 20, is provided for supporting the ancillary device, such as a steering gear, on the side rail 13. The mounting bracket 20 includes a generally flat web 21 having upper and lower flanges 22 and 23 extending therefrom. Between the two flanges, a reinforcing structure, indicated generally at 24, is provided. In the illustrated embodiment, the reinforcing structure 24 is formed integrally with the web 21 and the flanges 22 and 23, such as by casting. However, the reinforcing structure 24 may be formed in any desired manner. The illustrated reinforcing structure 24 includes one or more spacers 25 that extend laterally from the web 21. In the illustrated embodiment, the reinforcing structure 24 includes three of such spacers 25 that are spaced apart generally in accordance with the corners of the triangular shape of the opening 13e described above. However, it will be appreciated that any number of such spacers 25 may be provided and positioned in any desired manner arrangement. As best shown in FIG. 6, each of the spacers 25 is hollow, having a generally cylindrical bore 26 formed therethrough. The bores 26 can be formed in any desired manner, such as during the casting process or by drilling. The bores 26 are provided for a purpose that is described below and may, if desired, be omitted.

The side rail 13 and the mounting bracket 20 can be assembled as shown in FIGS. 4, 5, and 6. As shown therein, the mounting bracket 20 is preferably sized such that the upper and lower flanges 22 and 23 are spaced apart by approximately the same distance as the outer surfaces of the upper and lower walls 13c and 13d of the side rail 13. Furthermore, the reinforcing structure 24 of the mounting bracket 20 is preferably sized to be slighter smaller than the opening 13e formed through the side rail 13. Also, the spacers 25 are preferably formed having an axial length that is approximately the same as the distance between the outer surfaces of the outer and inner walls 13a and 13b of the side rail 13. Lastly, the ends of each of the spacers 25 are preferably sized to coincide with the size of the apertures 13f formed through the wall 13b of the side rail 13.

As best shown in FIG. 6, when the mounting bracket 20 is moved laterally into engagement with the side rail 13, the upper and lower flanges 22 and 23 of the mounting bracket 20 respectively abut the upper and lower walls 13c and 13d of the side rail 13. At the same time, the reinforcing structure 24 of the mounting bracket 20 is received within the opening 13e of the side rail 13. This allows the spacers 25 to extend through the interior of the side rail 13. As mentioned above, the axial length of such spacers 25 is such that the ends thereof are received within the apertures 13f formed through the wall 13b of the side rail 13 when the reinforcing structure 24 is assembled to the side rail 13.

The mounting bracket 20 can then be secured to the side rail 13 in any conventional manner. In the illustrated embodiment, the mounting bracket 20 is secured to the side rail 13 by one or more conventional welds 30 that extend along the web 21 and flanges 22 and 23 of the mounting bracket 20. Although the illustrated welds 30 extend continuously about the mounting bracket 20, it will be appreciated that such welds 30 may, if desired, be discontinuous. Alternatively, the mounting bracket 20 can be secured to the side rail 13 by adhesives, magnetic pulse welding techniques, or other known means. If desired, the ends of the spacers 25 can be secured to the wall 13b of the side rail 13 about the apertures 13f, such as by welding and the like. Such securement provides desired lateral support, as will be described below. If desired, the apertures 13f can be omitted, and the spacers 25 can be formed having an axial length that is slightly less than the distance between the outer surfaces of the outer and inner walls 13a and 13b of the side rail 13. As a result, when the mounting bracket 20 is assembled to the side rail 13, the ends of the spacers 25 will abut the inner surface of the wall 13b of the side rail. In this instance, although the ends of the spacers 25 are not positively secured to the wall 13b of the side rail 13, their abutment with the inner surface of such wall 13b provides the desired lateral support.

As mentioned above, the spacers 25 may have generally cylindrical bores 26 formed therethrough. Such bores 26 may be provided to receive portions of respective threaded fasteners (not shown) therein or therethrough. These threaded fasteners may be used to secure the ancillary device to the mounting bracket 20 and, therefore, to the side rail 13. To accomplish this, the ancillary device may be positioned adjacent to the mounting bracket 20 such that apertures formed through portions of the ancillary device are aligned with the bores 26 formed through the spacers 25. Then, the threaded fasteners are inserted through the aligned apertures in the ancillary device and into the bores 26 of the spacers 25. The bores 26 may be threaded to cooperate with the threaded fasteners. Alternatively, the threaded fasteners may extend completely through the spacers 25 and the opposite wall 13b of the side rail 13. Thus, the ends of the threaded fasteners are easily accessible for threading a nut or other retaining device thereon. If desired, such threaded fasteners may also be used to positively secure the mounting bracket 20 to the side rail 13.

After the ancillary device is secured to the mounting bracket 20 and the side rail 13 as described above, it can be operated in the known manner. Torsional loads and other forces that are generated by operation of the ancillary device are transferred through the mounting bracket 20 to the side rail 13. The strength of the side rail 13 is increased by the engagement of the web 21 and the flanges 22 and 23 of the mounting bracket 20 with the outer surfaces of the walls 13a, 13c, and 13d thereof. Additionally, the engagement of the reinforcing structure 24 of the mounting bracket 20 with the inner surface of the wall 13b of the side rail 13 provides additional strength. Thus, the mounting bracket 20 facilitates the use of such ancillary devices on the side rail 13.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly adapted to support an ancillary device comprising:
   a closed channel structural member including first and second walls, said first wall having an opening formed therethrough and said second wall having an aperture formed therethrough; and
   a mounting bracket adapted to support the ancillary device, said mounting bracket including a first portion that engages and is secured to said first wall of said closed channel structural member, said mounting bracket further including a reinforcing structure that extends through said opening and into said aperture so as to engage said second wall of said closed channel structural member.

2. The assembly defined in claim 1 wherein said reinforcing structure is secured to said second wall of said closed channel structural member.

3. The assembly defined in claim 1 wherein said mounting bracket includes a web that engages and is secured to said first wall of said closed channel structural member and first and second flanges that engage and are secured to said closed channel structural member.

4. The assembly defined in claim 1 wherein said reinforcing structure includes a plurality of spacers that extend through said opening and engage said second wall of said closed channel structural member.

5. The assembly defined in claim 1 wherein said reinforcing structure has a bore formed therein to support the ancillary device.

6. An assembly adapted to support an ancillary device comprising:
   a closed channel structural member including first and second walls, said first wall having an opening formed therethrough; and
   mounting bracket adapted to support the ancillary device, said mounting bracket including a web that engages and is secured to said first wall of said closed channel structural member and first and second flanges that engage and are secured to said closed channel structural member, said mounting bracket further including a reinforcing structure that extends through said opening and engages said second wall of said closed channel structural member.

7. The assembly defined in claim 6 wherein said second wall of said closed channel structural member has an aperture formed therethrough, and wherein said reinforcing structure of said mounting bracket extends into said aperture.

8. The assembly defined in claim 7 wherein said reinforcing structure is secured to said second wall of said closed channel structural member.

9. The assembly defined in claim 6 wherein said reinforcing structure includes a plurality of spacers that extend through said opening and engage said second wall of said closed channel structural member.

10. The assembly defined in claim 6 wherein said reinforcing structure has a bore formed therein to support the ancillary device.

11. An assembly adapted to support an ancillary device comprising:
    a closed channel structural member including first and second walls, said first wall having an opening formed therethrough; and
    a mounting bracket adapted to support the ancillary device, said mounting bracket including a first portion that engages and is secured to said first wall of said closed channel structural member, said mounting bracket further including a reinforcing structure that includes a plurality of spacers that extend through said opening and engages said second wall of said closed channel structural member.

12. The assembly defined in claim 11 wherein said second wall of said closed channel structural member has an aperture formed therethrough, and wherein said reinforcing structure of said mounting bracket extends into said aperture.

13. The assembly defined in claim 12 wherein said reinforcing structure is secured to said second wall of said closed channel structural member.

14. The assembly defined in claim 11 wherein said mounting bracket includes a web that engages and is secured to said first wall of said closed channel structural member and first and second flanges that engage and are secured to said closed channel structural member.

15. The assembly defined in claim 11 wherein said reinforcing structure has a bore formed therein to support the ancillary device.

16. A vehicle frame assembly adapted to support an ancillary device comprising:
    a plurality of structural members connected together to form a frame, at least one of said structural members being a closed channel structural member including first and second walls, said first wall having an opening formed therethrough and said second wall having an aperture formed therethrough; and
    a mounting bracket adapted to support the ancillary device, said mounting bracket including a first portion that engages and is secured to said first wall of said closed channel structural member, said mounting bracket further including a reinforcing structure that extends through said opening and into said aperture so as to engage said second wall of said closed channel structural member.

17. The vehicle frame assembly defined in claim wherein said reinforcing structure is secured to said second wall of said closed channel structural member.

18. The vehicle frame assembly defined in claim 16 wherein said mounting bracket includes a web that engages and is secured to said first wall of said closed channel structural member and first and second flanges that engage and are secured to said closed channel structural member.

19. The vehicle frame assembly defined in claim 16 wherein said reinforcing structure includes a plurality of spacers that extend through said opening and engage said second wall of said closed channel structural member.

20. The vehicle frame assembly defined in claim 16 wherein said reinforcing structure has a bore formed therein to support the ancillary device.

21. A vehicle frame assembly adapted to support an ancillary device comprising:
    a plurality of structural members connected together to form a frame, at least one of said structural members being a closed channel structural member including first and second walls, said first wall having an opening formed therethrough; and
    a mounting bracket adapted to support the ancillary device, said mounting bracket including a web that engages and is secured to said first wall of said closed channel structural member and first and second flanges that engage and are secured to said closed channel structural member, said mounting bracket further including a reinforcing structure that extends through said opening and engages said second wall of said closed channel structural member.

22. The vehicle frame assembly defined in claim 21 wherein said second wall of said closed channel structural member has an aperture formed therethrough, and wherein said reinforcing structure of said mounting bracket extends into said aperture.

23. The vehicle frame assembly defined in claim 21 wherein said reinforcing structure is secured to said second wall of said closed channel structural member.

24. The vehicle frame assembly defined in claim 21 wherein said reinforcing structure includes a plurality of spacers that extend through said opening and engage said second wall of said closed channel structural member.

25. The vehicle frame assembly defined in claim 21 wherein said reinforcing structure has a bore formed therein to support the ancillary device.

26. A vehicle frame assembly adapted to support an ancillary device comprising:
   a plurality of structural members connected together to form a frame, at least one of said structural members being a closed channel structural member including first and second walls, said first wall having an opening formed therethrough; and
   a mounting bracket adapted to support the ancillary device, said mounting bracket including a first portion that engages and is secured to said first wall of said closed channel structural member, said mounting bracket further including a reinforcing structure that includes a plurality of spacers that extend through said opening and engages said second wall of said closed channel structural member.

27. The vehicle frame assembly defined in claim 26 wherein said second wall of said closed channel structural member has an aperture formed therethrough, and wherein said reinforcing structure of said mounting bracket extends into said aperture.

28. The vehicle frame assembly defined in claim 26 wherein said reinforcing structure is secured to said second wall of said closed channel structural member.

29. The vehicle frame assembly defined in claim 26 wherein said mounting bracket includes a web that engages and is secured to said first wall of said closed channel structural member and first and second flanges that engage and are secured to said closed channel structural member.

30. The vehicle frame assembly defined in claim 26 wherein said reinforcing structure has a bore formed therein to support the ancillary device.

31. A combined vehicle frame assembly and ancillary device comprising:
   a plurality of structural members connected together to form a vehicle frame assembly, at least one of said structural members being a closed channel structural member including first and second walls, said first wall having an opening formed therethrough;
   a mounting bracket including a first portion that engages and is secured to said first wall of said closed channel structural member, said mounting bracket further including a reinforcing structure that extends through said opening and engages said second wall of said closed channel structural member; and
   an ancillary device secured to said mounting bracket so as to be supported on said vehicle frame assembly.

32. The combined vehicle frame assembly and ancillary device defined in claim 31 wherein said second wall of said closed channel structural member has an aperture formed therethrough, and wherein said reinforcing structure of said mounting bracket extends into said aperture.

33. The combined vehicle frame assembly and ancillary device defined in claim 32 wherein said reinforcing structure is secured to said second wall of said closed channel structural member.

34. The combined vehicle frame assembly and ancillary device defined in claim 31 wherein said mounting bracket includes a web that engages and is secured to said first wall of said closed channel structural member and first and second flanges that engage and are secured to said closed channel structural member.

35. The combined vehicle frame assembly and ancillary device defined in claim 31 wherein said reinforcing structure includes a plurality of spacers that extend through said opening and engage said second wall of said closed channel structural member.

36. The combined vehicle frame assembly and ancillary device defined in claim wherein said reinforcing structure has a bore formed therein to support the ancillary device.

* * * * *

UNITED STATES PATENT AND TRADEMARK OFFICE
CERTIFICATE OF CORRECTION

PATENT NO. : 6,439,608 B1
DATED : August 27, 2002
INVENTOR(S) : Kenneth J. Bonnville It is certified that error appears in the above-identified patent and that said Letters Patent is hereby corrected as shown below:

Column 7,
Line 42, insert the word -- a -- before "mounting"

Column 8,
Line 44, insert the claim number -- 16 -- before "wherein"

Column 10,
Line 44, insert the claim number -- 31 -- before "wherein"

Signed and Sealed this

Twenty-sixth Day of November, 2002

Attest:

Attesting Officer

JAMES E. ROGAN
*Director of the United States Patent and Trademark Office*